United States Patent
Huang et al.

(10) Patent No.: US 10,521,588 B1
(45) Date of Patent: Dec. 31, 2019

(54) DYNAMIC ANALYSIS OF MALWARE THAT HAS EVASION CODE

(71) Applicant: Trend Micro Incorporated, Tokyo (JP)

(72) Inventors: Qiang Huang, Nanjing (CN); Hu Cao, Nanjing (CN); Jun Wu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 171 days.

(21) Appl. No.: 15/690,591

(22) Filed: Aug. 30, 2017

(51) Int. Cl.
| G06F 12/14 | (2006.01) |
| H04L 29/06 | (2006.01) |
| G06F 21/56 | (2013.01) |
| G06F 21/53 | (2013.01) |
| G06F 21/55 | (2013.01) |

(52) U.S. Cl.
CPC ............ G06F 21/563 (2013.01); G06F 21/53 (2013.01); G06F 21/554 (2013.01); G06F 2221/034 (2013.01)

(58) Field of Classification Search
CPC ...... G06F 21/563; G06F 21/53; G06F 21/554; G06F 2221/034
USPC .............................. 726/23–25; 713/165, 188
See application file for complete search history.

(56) References Cited

U.S. PATENT DOCUMENTS

| 8,990,939 | B2 | 3/2015 | Staniford et al. | |
|---|---|---|---|---|
| 9,071,638 | B1 | 6/2015 | Aziz et al. | |
| 9,106,694 | B2 | 8/2015 | Aziz et al. | |
| 9,159,035 | B1 | 10/2015 | Ismael et al. | |
| 9,171,160 | B2 | 10/2015 | Vincent et al. | |
| 9,817,974 | B1 | 11/2017 | Huang et al. | |
| 2006/0277539 | A1* | 12/2006 | Amarasinghe | G06F 21/53 717/168 |
| 2007/0006314 | A1* | 1/2007 | Costa | G06F 21/554 726/25 |
| 2008/0209525 | A1* | 8/2008 | Ben-Shoshan | G06F 21/126 726/4 |
| 2009/0158260 | A1* | 6/2009 | Moon | G06F 11/3612 717/133 |
| 2012/0151268 | A1* | 6/2012 | Dearing | G06F 11/3632 714/38.1 |
| 2013/0061213 | A1* | 3/2013 | Felch | G06F 8/4434 717/149 |
| 2014/0007184 | A1* | 1/2014 | Porras | G06F 21/53 726/1 |
| 2014/0201807 | A1* | 7/2014 | White | G06F 21/53 726/1 |
| 2014/0372719 | A1* | 12/2014 | Lange | G06F 12/1491 711/163 |
| 2014/0380474 | A1 | 12/2014 | Paithane et al. | |

(Continued)

Primary Examiner — Aravind K Moorthy
(74) Attorney, Agent, or Firm — Okamoto & Benedicto LLP

(57) ABSTRACT

A sample program being evaluated for malware is scanned for presence of a critical code block. A path guide is generated for the sample program, with the path guide containing information on executing the sample program so that an execution path that leads to the critical code block is taken at runtime of the sample program. The path guide is applied to the sample program during dynamic analysis of the sample program so that behavior of the sample program during execution to the critical code block can be observed. This advantageously allows for detection of malicious samples, allowing for a response action to be taken against them.

11 Claims, 4 Drawing Sheets

(56) References Cited

U.S. PATENT DOCUMENTS

| | | | |
|---|---|---|---|
| 2016/0357958 A1* | 12/2016 | Guidry | G06F 21/53 |
| 2017/0090952 A1 | 3/2017 | Griesemer et al. | |
| 2017/0116415 A1* | 4/2017 | Stopel | G06F 21/554 |
| 2017/0244759 A1* | 8/2017 | Attfield | G06F 21/53 |
| 2018/0293122 A1* | 10/2018 | Craske | G06F 11/073 |
| 2018/0349603 A1* | 12/2018 | Yamada | G06F 21/554 |
| 2019/0089720 A1* | 3/2019 | Aditham | G06F 16/9014 |

\* cited by examiner

DYNAMIC ANALYSIS OF MALWARE THAT HAS EVASION CODE

BACKGROUND OF THE INVENTION

1. Field of the Invention

The present invention relates generally to computer security, and more particularly but not exclusively to methods and systems for detecting malware.

2. Description of the Background Art

Malware may be detected using so-called dynamic analysis, which involves running and monitoring the behavior of the malware. The dynamic analysis is typically performed in a sandbox, such as a suitably-configured virtual or physical machine. One problem with dynamic analysis is that the analysis is typically performed along a single execution path, making the analysis vulnerable to evasion techniques. For example, malware with evasion code can hide its malicious nature by not executing or by performing seemingly normal operations unless it detects a particular condition. This prevents proper evaluation of the malware in a sandbox and other dynamic analysis platforms.

SUMMARY

In one embodiment, a sample program being evaluated for malware is scanned for presence of a critical code block. A path guide is generated for the sample program, with the path guide containing information on executing the sample program so that an execution path that leads to the critical code block is taken at runtime of the sample program. The path guide is applied to the sample program during dynamic analysis of the sample program so that behavior of the sample program during execution to the critical code block can be observed. This advantageously allows for detection of malicious samples, allowing for a response action to be taken against them.

These and other features of the present invention will be readily apparent to persons of ordinary skill in the art upon reading the entirety of this disclosure, which includes the accompanying drawings and claims.

Figure 1:
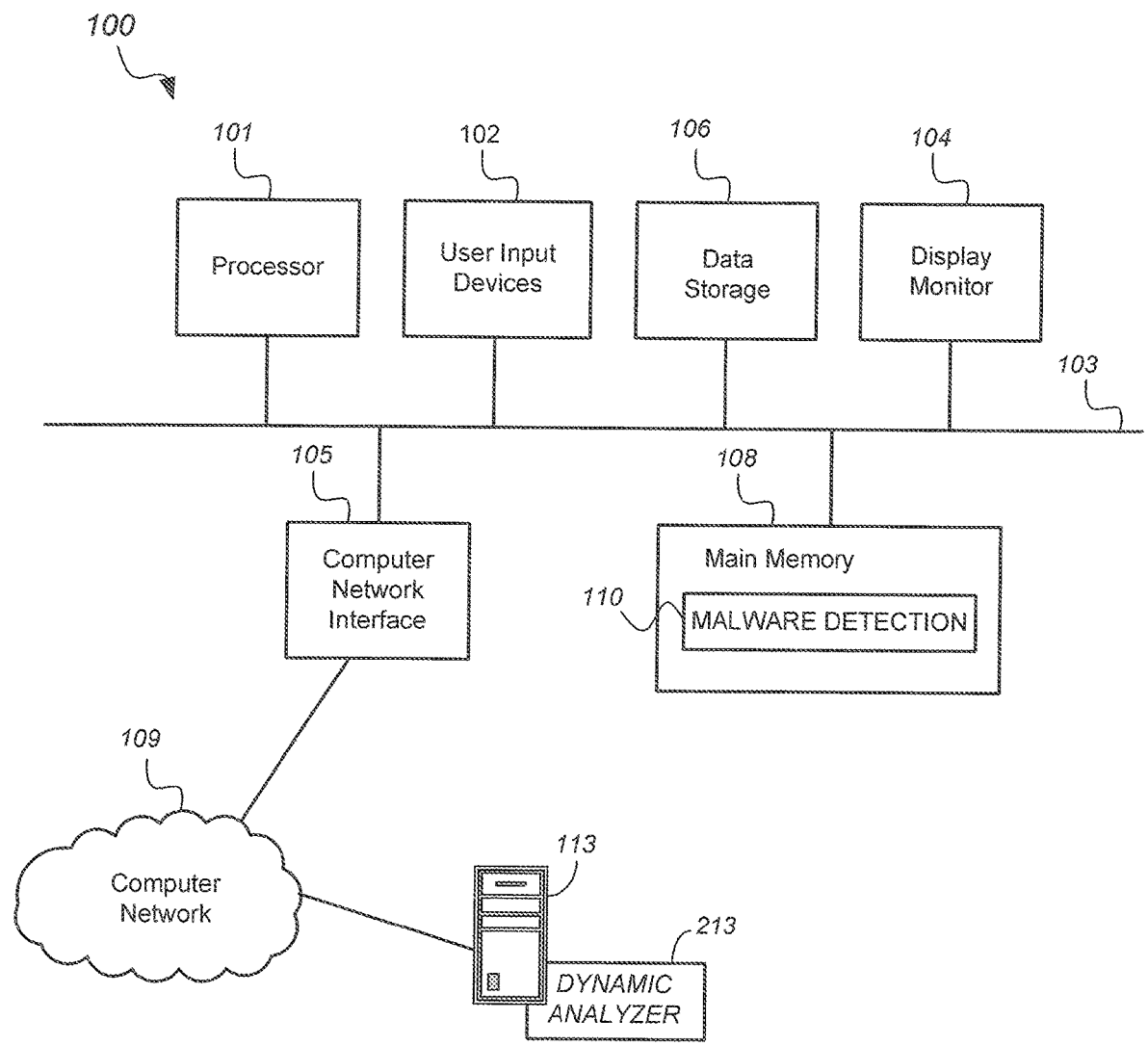
FIG. 1 shows a schematic diagram of a computer in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A sample program ("sample") being evaluated for malware may contain conditional branches that vary the sample's execution behavior depending on the branch taken. To make matters worse, the branch conditions may also vary. For example, a branch condition may check if a specific process exists, but another branch condition may check for a specific date or time. The conditional branches may hinder evaluation of the sample in a sandbox (or some other dynamic analysis platform) because the environment provided by the sandbox may not be able to satisfy all of the branch conditions. When a branch condition is not satisfied, the execution path through the branch is not taken, thereby preventing analysis of operations performed through the branch.

Put another way, the sample may include a branch condition check that makes the sample execution sequence fork to one of two different execution paths. There is no guarantee that the execution path taken leads to a critical code block, i.e., a block of code (e.g., instructions, functions, application programming interfaces (APIs)) that may pose a computer security issue. Therefore, a sample cannot be properly evaluated in the sandbox unless execution paths through critical code blocks are taken during behavior monitoring of the sample.

More particularly, a sandbox analyzes samples in a controlled environment that includes monitoring modules. The monitoring modules use hooking or hypervisor technologies to record execution traces, such as API calls, files accessed, network addresses connected to, and so on. When the sandbox receives a sample, it will copy the sample into the controlled environment and let the sample execute. The monitoring modules then record execution traces of the sample's execution. The sandbox then makes a decision on whether or not the sample is malicious based on the execution traces.

The traditional operation of a sandbox works effectively on most samples. However, the inventors have observed that some samples have few observable behaviors during analysis at runtime, i.e., during execution. These samples make branch condition checks and go through a single execution path, avoiding other execution paths while executing in the sandbox. The traditional sandbox operation thus cannot observe hidden behaviors of the sample, especially when the actual execution path taken has few observable behaviors.

There are many kinds of branch condition checks that a malware can perform, such as checking for a specific date and time to trigger specific functions, checking for a specific process to determine whether the sample is executing in a sandbox, and so on. Table 1 below shows an example code block with conditional branching that a malware may perform to evade detection.

TABLE 1

| | | |
|---|---|---|
| 03501691 | lea ecx, [ebp+sys_time] | |
| 03501694 | push ecx | |
| 03501695 | call [ebp+fpGetSystemTime] | ;GetSystemTime to get current date |
| 03501698 | movzx edx, [ebp+sys_time.wMonth] | |
| 03501B9C | cmp edx, 9 | ; Check for September |
| 03501B9F | jz short @@ContinueRun | ; If today is in September, continue to run |
| 03501BA1 | xor eax, eax | ; else, exit program. |
| 03501BA3 | jmp @@ExitProgram | |

In the example of Table 1, a conditional branch (at memory address "03501B9F") checks the current month (condition at memory address "03501B9C"), and either continues execution if the current month is September or exits the program if the current month is not September. Therefore, unless the current month is September, the sandbox will not be able to observe execution of the rest of the program. When employed in a malware, the code block of Table 1 allows the malware to remain undetectable until a particular month (or some other date/time).

Samples that check for particular computing environments may be induced to execute in the sandbox if the conditions expected by the malware are known beforehand. For example, if it is known that the malware checks for the month of September, the date of the sandbox may be set to September. As another example, if the sample looks for a particular web browser, that web browser may be installed in the sandbox. If the sample checks for a virtual machine, traces of the virtual machine may be hidden. However, in practice, it is relatively difficult to find out all the conditions expected by the sample.

Referring now to FIG. 1, there is shown a schematic diagram of a computer 100 in accordance with an embodiment of the present invention. The computer 100 may be employed to evaluate a program for malware. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with one or more program modules comprising instructions stored non-transitory in the main memory 108 for execution by the processor 101. An article of manufacture may be embodied as computer-readable storage medium including instructions that when executed by the processor 101 of the computer 100 causes the computer 100 to be operable to perform the functions of the one or more program modules.

In the example of FIG. 1, the program modules comprise a malware detection program 110. The malware detection program 110 may be configured to generate a path guide for a sample being evaluated for malware and perform dynamic analysis of the sample with the path guide applied to the sample. The functionality of the malware detection program 110 may be distributed to one or more computers. For example, the path guide may be generated in the computer 100 and provided to a computer 113 over the computer network 109. The computer 113 may monitor the behavior of the sample, with the path guide applied, in a dynamic analyzer 213. In some embodiments, the dynamic analyzer 213 comprises a virtual machine sandbox hosted by the computer 100. The path guide allows paths to critical code blocks in the sample to be traversed during execution and behavior monitoring of the sample.

Figure 2:
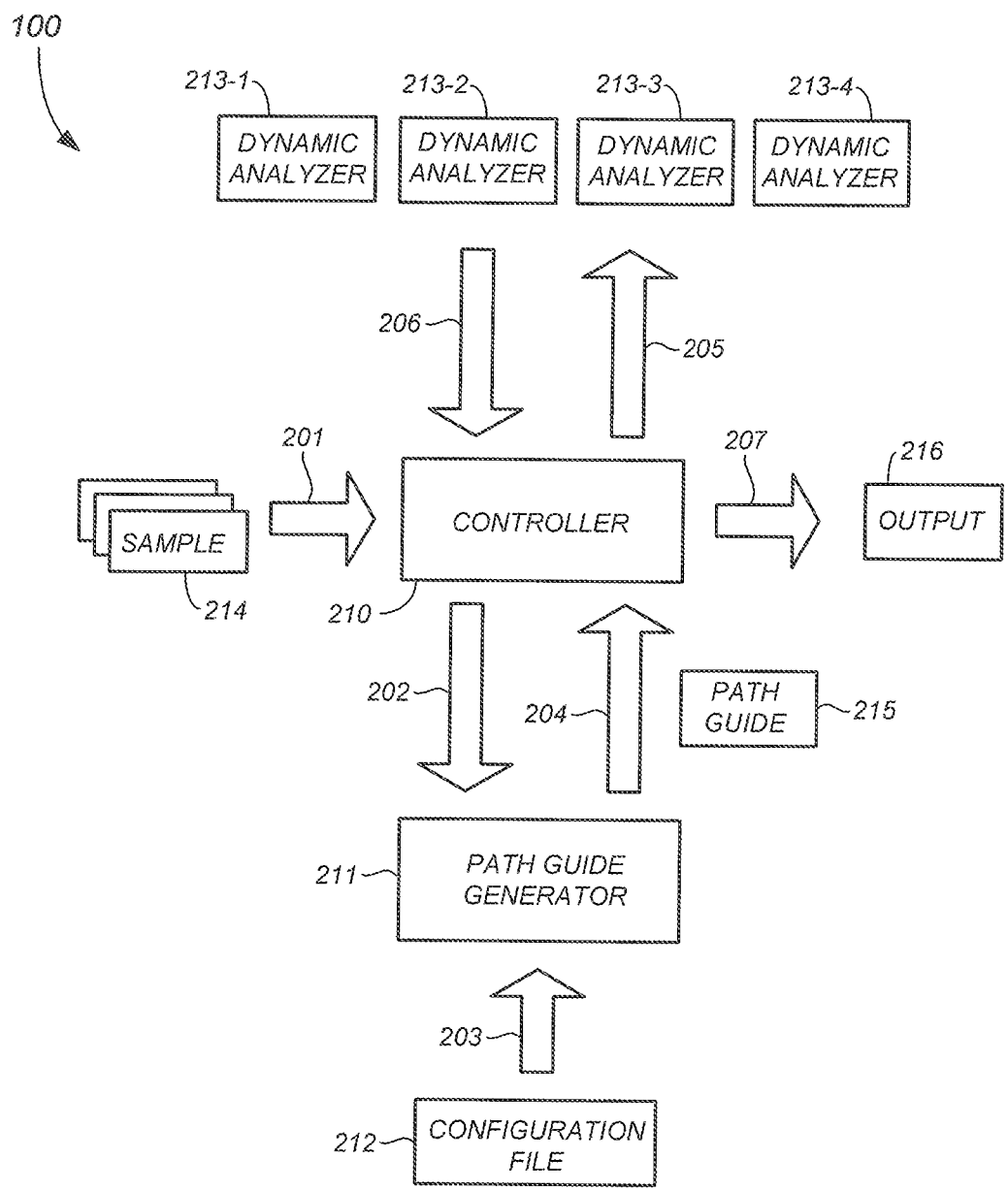
FIG. 2 shows a system for detecting malware in accordance with an embodiment of the present invention.

FIG. 2 shows a system for detecting malware in accordance with an embodiment of the present invention. In the example of FIG. 2, the system is implemented as the computer 100 with the malware detection module 110 comprising a controller 210, a path guide generator 211, and one or more dynamic analyzers 213 (i.e., 213-1, 213-2, 213-3, 213-4, etc.).

In the example of FIG. 2, a configuration file 212 includes information for identifying critical code blocks. The configuration file 212 may indicate sensitive and insensitive computer operations that may be used to identify a critical code block. In one embodiment, a sensitive operation is a function, instruction, and/or Application Programming Interface (API) that exposes the computer to security risks, and is thus susceptible to being exploited by malware. Using the Microsoft Windows™ operating system as an example, sensitive operations may include the following APIs: CreateProcess function (may be used to start a new malicious process), the WriteProcessMemory function (may be used for code injection), URLDownloadToFile function (may be used to download malicious payload from the Internet), and so on. In one embodiment, an insensitive operation is a function, instruction, and/or API that stops execution of the sample itself, such as the ExitProcess function (may be used to terminate current execution immediately) in the Microsoft Windows™ operating system.

In one embodiment, a code block that directly includes (i.e., in the code block itself) one or more sensitive operations is deemed to be a critical code block. In other embodiments, a code block that includes a sub-function which includes one or more sensitive operations is also deemed to be a critical code block. In that embodiment, the code block includes a sensitive operation indirectly, and is thus deemed a critical code block.

In one embodiment, under the condition that no sensitive operation is identified, when a function (or a code block comprising two or more code blocks) includes a conditional branch to a code block that either directly or indirectly includes an insensitive operation or to a code block that does not include an insensitive operation, the code block that does not include an insensitive operation may be deemed to be a critical code block. This is illustrated with the example of Table 2.

TABLE 2

```
FUNCTION_A ( ) {
    if (time>12:00 pm) {
        ExitProcess( )
    }
    else {
        // do bad things
    }
}
```

Table 2 shows the pseudocode for an example function FUNCTION_A, which has no sensitive operation directly or indirectly. FUNCTION_A contains a conditional branch to a code block that includes the ExitProcess( ) function (TRUE branch) or to a code block of the else statement (FALSE branch), depending on the current time. Because FUNCTION_A has no sensitive operation, and ExitProcess( ) has been defined as an insensitive operation, the alternate branch to the else statement is deemed to be a critical code block. This reflects the observation made by the inventors that insensitive operations are used by malware to exit out of the program instead of executing the alternative path.

In one embodiment, under the condition that neither sensitive nor insensitive operation is identified, when a function (or a code block comprising two or more code blocks) includes a conditional branch to one of two code blocks, the code block with significantly more instructions is deemed to be a critical code block. More particularly, if a condition branch goes to a code block with one instruction or to a code block with a hundred instructions, the code block with the hundred instructions may be deemed to be a critical code block. The ratio of the number of instructions of the two execution branches of the conditional branch may be set depending on implementation details. This is illustrated with the example of Table 3.

TABLE 3

```
FUNCTION_B( ) {
    if (time>12:00 pm) {
        return; // only one instruction here
    }
    else {
        // do things in the following code
        //containing hundreds of instructions
        ...
        ...
    }
}
```

Table 3 shows an example function FUNCTION_B, which has no sensitive or insensitive operation directly or indirectly. FUNCTION_B contains a conditional branch to a code block that has one instruction (TRUE branch) or to a code block of the else statement (FALSE branch), depending on the current time. Because the TRUE branch has one instruction and the FALSE branch has hundreds of instructions, the FALSE branch has significantly more instructions relative to the TRUE branch. Accordingly, the code block of the FALSE branch is deemed to be a critical code block.

In one embodiment, the aforementioned rules for identifying critical code blocks are applied independently of one another. In other embodiments, the aforementioned rules for identifying critical code blocks are applied in a prioritized order. In that embodiment, the identification of a sensitive operation has the highest priority. A code block is deemed a critical code block once a sensitive operation is identified in the code block, regardless of whether or not the code block includes an insensitive operation and regardless of the number of instructions of the code block. Identifying a critical code block by absence of an insensitive operation takes second priority, and may be applied under the condition that the code block has no sensitive operation directly or indirectly. Identifying a critical code block by the number of instructions relative to different branches takes third priority, and may be applied when the code block does not have a sensitive or insensitive operation directly or indirectly.

The aforementioned rules and information for identifying critical code blocks may be indicated in the configuration file 212.

Continuing the example of FIG. 2, the path guide generator 211 is configured to receive a sample 214, scan the sample 214 for presence of critical code blocks that are defined in the configuration file 212, and generate a path guide 215 that allows for execution of the sample 214 through an execution path that leads to an identified critical code block. The path guide generator 211 may be configured to perform code analysis and program analysis for executable binary, including disassembly, control flow analysis, data flow analysis etc. of the sample 214.

The path guide 215 may comprise information on executing the sample 214 such that a sequence of instructions leading to an identified critical code block are executed. In one embodiment, the path guide 215 comprises information for forcing execution from an entry point to a critical code block. For example, the path guide 215 may comprise code patches to transfer execution control flow along an execution path that leads to the critical code block. A code patch may include the memory address and the content to be patched.

In the example of FIG. 2, a dynamic analyzer 213 comprises a dynamic analysis platform, such as a sandbox. A dynamic analyzer 213 may be hosted in a computer (i.e., physical machine) or in a virtual machine. A dynamic analyzer 213 may be hosted in the computer 100 or in a separate computer, such as in the computer 113 (see FIG. 1). A dynamic analyzer 213 may comprise an emulator, interpreter, debugger, Dynamic Binary Instrumentation (DBI) tool, or any suitable tool for monitoring and controlling program runtime behavior and collecting execution information. Any suitable algorithm for detecting malware based on behavioral monitoring or heuristics may be employed without detracting from the merits of the present invention.

In the example of FIG. 2, the controller 210 is configured to manage the process flow of detecting malware. The controller 210 may be configured to forward a sample 214 to the path guide generator 211, receive a path guide 215 for the sample 214, forward the sample 214 and its corresponding path guide 215 to one of a plurality of dynamic analyzers 213, receive from the dynamic analyzer 213 a result of the evaluation of the sample 214, and generate a detection output 216 that indicates the result of the evaluation. The detection output 216 may also include the path guide 215 for use by other computer security modules.

In an example operation, the controller 210 receives one of a plurality of samples 214 for evaluation for malware (arrow 201). The controller 210 forwards the sample 214 to the path guide generator 211 (arrow 202). The path guide generator 211 consults the configuration file 212 to receive current information on identifying critical code blocks (arrow 203) and scans the sample 214 for presence of critical code blocks. For example, the controller 210 may consult the configuration file 212 to get a listing of sensitive and insensitive operations, rules for identifying critical code blocks, etc.

The path guide generator 211 analyzes the sample 214 to identify an execution path to an identified critical code block. The path guide generator 211 generates the path guide 215, which provides information for traversing an execution path to the identified critical code block. In one embodiment, the path guide generator 211 provides a guide in controlling the execution flow to the identified critical code block by direct branching to an execution path that leads to the identified critical code block, patching the sample to execute to the identified critical code block, and/or providing inputs to the sample 214 so that branching conditions are satisfied and execution leads to the identified critical code block. A path guide 215 may be generated for each execution path to an identified critical code block. For example, when a plurality of different critical code blocks have been identified, a plurality of path guides 215, one for each critical code block, may be generated.

The path guide generator 211 provides the path guide 215 to the controller 210 (arrow 204), which provides the sample 214 and its path guide 215 to one of the dynamic analyzers 213 (arrow 205). The dynamic analyzer 213 applies the information in the path guide 215 in the execution of the sample 214, so that the sample 214 executes instructions all the way to the identified critical code block. This allows the dynamic analyzer 213 to monitor the true behavior of the sample 214. The dynamic analyzer 213 provides a result of the evaluation to the controller 210 (arrow 206). The controller 210 generates the output 216 (arrow 207), which includes the result of the evaluation (e.g., whether or not the sample is malware).

In one embodiment, if a plurality of path guides 215 are generated for the sample 214, the controller 210 may distribute each of the path guides 215 and the sample 214 to separate dynamic analyzers 213. Each of the dynamic analyzers 213 will then execute the sample 214 to an identified critical code block in accordance with the corresponding path guide 215. In that embodiment, the evaluation results from the dynamic analyzers 213 may be merged together and analyzed in the controller 210 to generate the output 216.

A response action, such as blocking communications that include the sample 214, placing the sample 214 in quarantine, deleting the sample 214, etc. may be performed against the sample 214 if it is detected to be malware. This allows a computer or computer network to be protected against the malware. For example, a signature of the sample 214 (e.g., hash) may be distributed to other security computers that are configured to scan incoming programs (e.g., in email attachment, network traffic, storage device, etc.) for presence of the signature and perform a response action against an incoming program that matches the signature.

Figure 3:
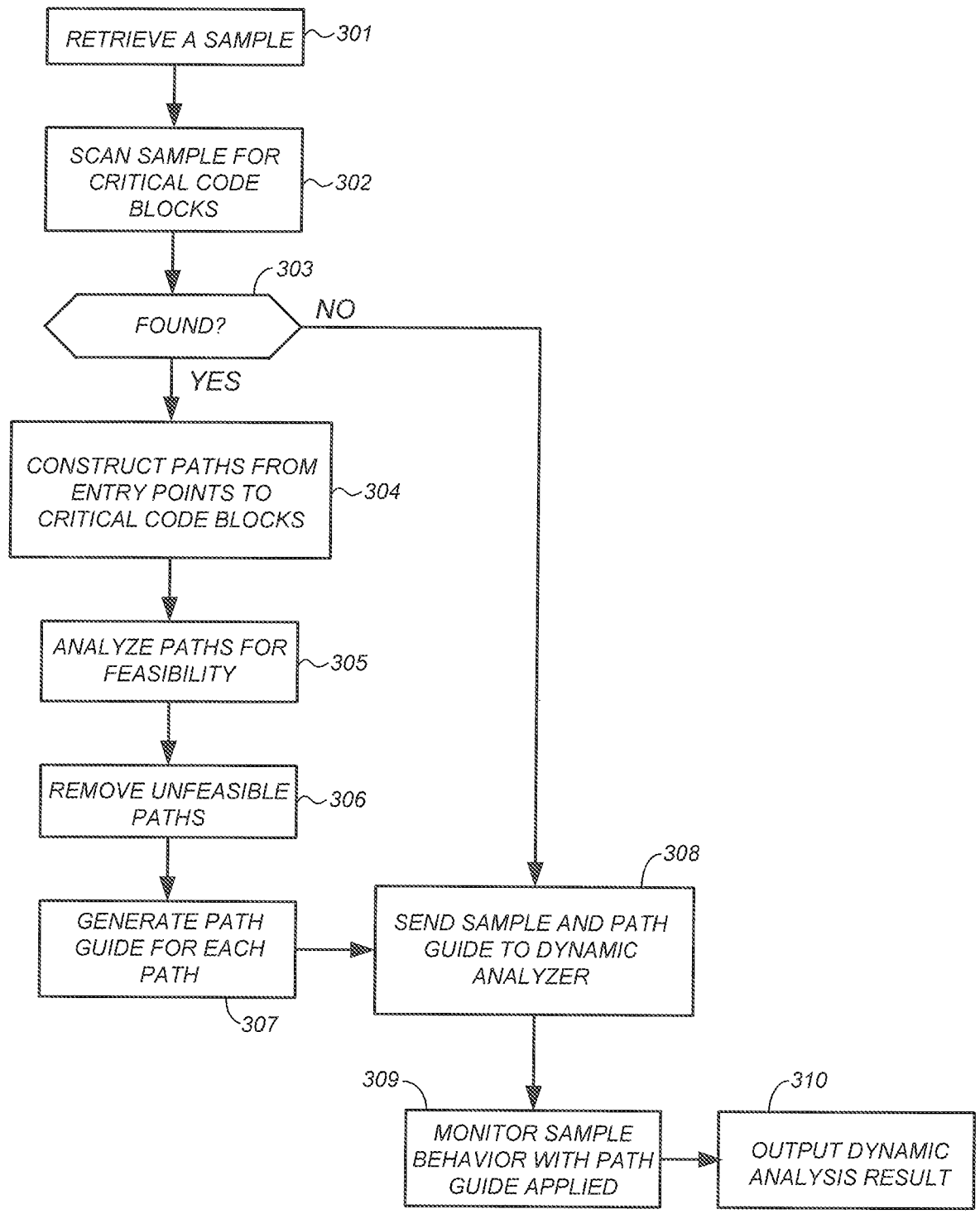
FIG. 3 shows a flow diagram of a method of detecting malware in accordance with an embodiment of the present invention.

FIG. 3 shows a flow diagram of a method of detecting malware in accordance with an embodiment of the present invention. The method of FIG. 3 is explained using previously described components. A means for generating a path guide may be implemented by a processor performing the steps 301-307 and a means for evaluating a sample program for malware using the path guide may be implemented by a processor performing the steps 308-310. As can be appreciated, other components may also be employed without detracting from the merits of the present invention.

In the example of FIG. 3, the controller 210 retrieves a sample for evaluation, and provides the sample to the path guide generator 211 (step 301). The path guide generator 211 begins analysis of the sample by scanning the sample for critical code blocks (step 302). For example, the path guide generator 211 may disassemble the binary of the sample.

The disassembly process translates the sample binary into assembly code, which the path guide generator 211 may scan for presence of critical code blocks defined in the configuration file 212. The path guide generator 211 may also construct a control flow graph of the sample to identify execution paths to critical code blocks. In the construction of the control flow graph, the global relationships among all sub-functions in the sample binary may be identified during inter-function analysis and the relationships in each individual function may be identified during intra-function analysis. The path guide generator 211 may employ any suitable algorithms to perform control flow and data flow analysis to identify execution paths and critical code blocks in the control flow graph. Because the path guide generator performs a static analysis of the sample, suitable anti-obfuscation techniques may be employed as necessary.

When the sample includes a critical code block (step 303 to step 304), the path guide generator 211 constructs a guided execution path from an entry point of the sample to the critical code block (step 304). The execution path is "guided" in that it forces the execution flow of the sample so that a sequence of instructions from the entry point to the critical code block are executed. The guided execution may involve direct branching to the identified critical code block, patching to execute to the identified critical code block, and/or providing inputs to the sample 214 so that the branching conditions are satisfied and the execution leads to the identified critical code block. The path guide generator 211 may construct a guided execution path for each critical code block.

For performance considerations, the process of generating the guided execution paths may be performed within a limited code range. Whether or not the path guide generator 211 goes deep into and performs recursive analysis of a sub-function invoked in a critical code block may depend on the available computing resources and performance standards. In one embodiment, a guided execution path only covers the execution path within the current function that includes the identified critical code block. In that embodiment, the guided execution path starts at the entry point of the current function and the branches to be taken are all located in the same function.

The path guide generator 211 analyzes each guided execution paths for feasibility (step 305). That is, the path guide generator 211 verifies that a guided execution path can be traversed. Operations later in the guided execution path may sometimes depend on previous data or previous operations. In that case, the guided execution path may not be feasible because it would lack the necessary data or previous operation. The path guide generator 211 checks a guided execution path to ensure that the sample can be executed properly along the guided execution path. In one embodiment, the path guide generator 211 looks for paradoxical constraints and data dependency that cannot be obtained by executing along the guided execution path.

The path guide generator 211 discards guided execution paths that are not feasible (step 306). In one embodiment, guided execution paths that are not feasible are those that would cause a crash, would give erroneous data, would hang the computer, are missing critical data, etc. The path guide generator 211 generates a path guide 215 for each feasible guided execution path (step 307). For ease of illustration, in this example, a single path guide 215 is generated for the sample.

The controller 210 receives the path guide 215 from the path guide generator 211. The controller 210 provides the sample and its corresponding path guide 215 to a dynamic analyzer 213, which is selected by the controller 210 to perform dynamic analysis of the sample (step 308). In one embodiment, in the event that the sample does not have any critical code block (step 303 to step 308), the controller 210 sends an empty path guide 215 to the dynamic analyzer 213.

The dynamic analyzer 213 executes the sample with the path guide 215 applied (step 309). In one embodiment, the dynamic analyzer 213 executes a sequence of instructions from an entry point of the sample to a critical code block in accordance with the path guide 215. The path guide 215 may include code patches to direct execution flow to the critical code block. In the case where the sample does not include a critical code block, the path guide 215 will be empty and the dynamic analyzer 213 simply executes the sample to monitor its behavior in traditional manner. The dynamic analyzer 213 monitors and records the behavior of the sample at runtime to evaluate the sample for malware. Advantageously, the path guide 215 allows the behavior of the sample to be observed while the sample executes along a guided execution path, which otherwise may not have been taken, to an identified critical code block. The dynamic analyzer 213 may provide a separate evaluation result for each path guide 215, i.e., execution along an execution path defined by the path guide 215. The dynamic analyzer 213 provides the result of the evaluation to the controller 210, which outputs the result (step 310). A response action may be performed against the sample if the sample turns out to be malware.

In one embodiment, the path guide 215 indicates the branches to be taken during sample execution and analysis. For example, conditional jump instructions in binary direct the execution flow to either a true branch or a false branch. Multiple branches that are sequenced together build a concrete execution path. The path guide 215 may indicate which branches are to be taken so that a desired execution path is traversed for dynamic analysis of the sample. During execution, the dynamic analyzer 213 may alter the execution flow when a branch defined in the path guide 215 is encountered.

In one embodiment, the path guide 215 comprises a code patch (i.e., code replacement) that is applied to the sample. For example, a conditional jump instruction at a specific memory address may be patched with a direct jump to the target branch. The path guide 215 may indicate the memory address and the binary code that should be patched during runtime in order to take the target branch.

In one embodiment, the path guide 215 comprises particular inputs to samples that satisfy the condition checks in branches. The path guide 215 may indicate a particular input to a condition check so that the execution flows to a desired execution path. When the sample 214 is launched in the dynamic analyzer 213, the particular inputs may be applied as arguments to the sample process in order to satisfy the condition checks during runtime, which allows for branching to the critical code block.

In practice, the number of execution paths that can be taken by the sample may be extremely large. Performance improvements may be achieved by some optimizing technologies, such as limiting execution of the sample only through an execution path defined by a path guide 215 (i.e., only execution paths that lead to a critical code block), eliminating evasive irrelevant condition check branches through a fine-grained data flow analysis along the external introduced data, and so on.

Figure 4:
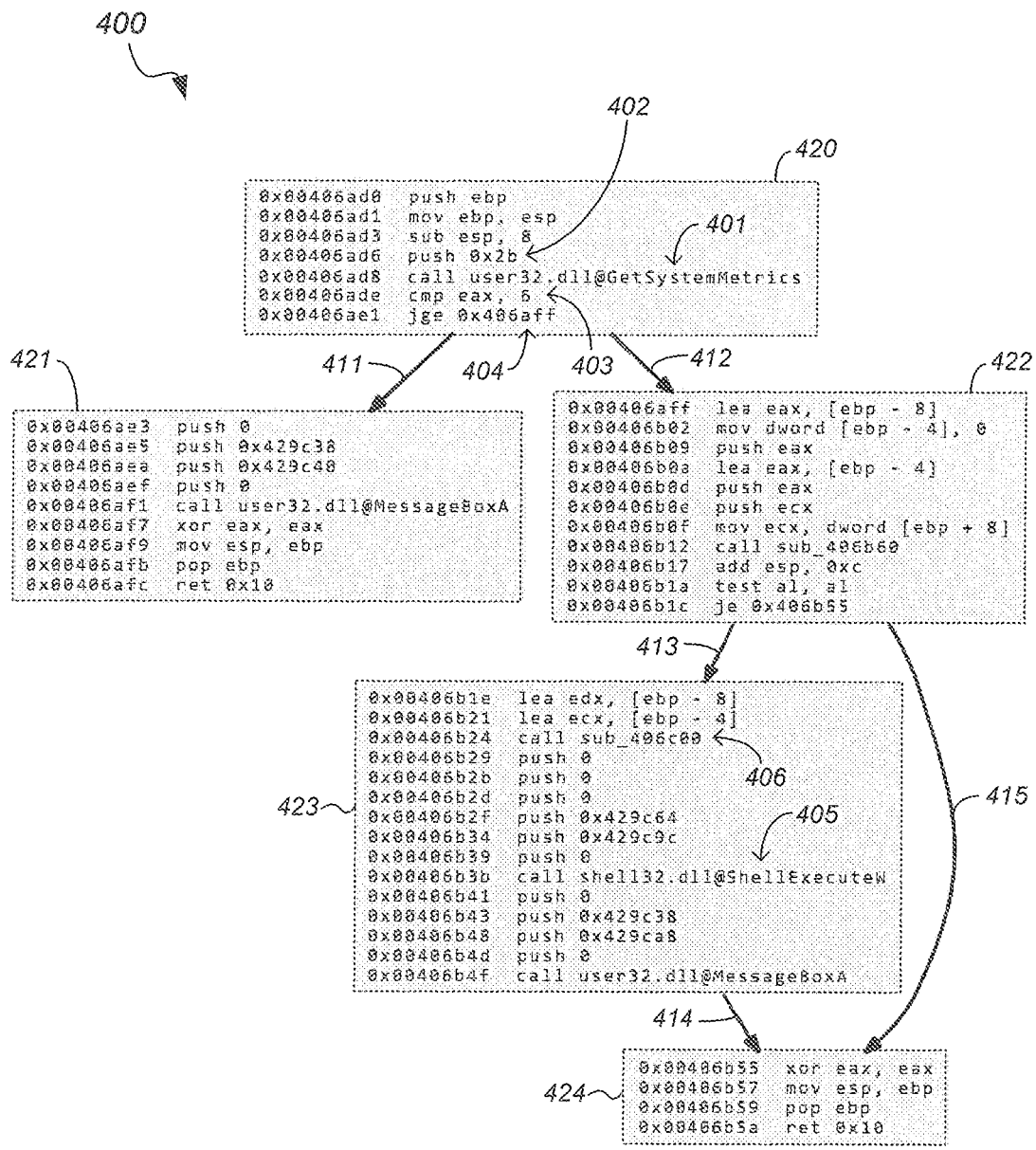
FIG. 4 shows a control flow graph of a sample that is being evaluated for malware in accordance with an embodiment of the present invention.

FIG. 4 shows a control flow graph of a sample 400 that is being evaluated for malware in accordance with an embodiment of the present invention. In the example of FIG. 4, the sample 400, which is a function, evades dynamic analysis by including an evasion code block 420 that checks for the presence of a six-button mouse in the computer. Such simple evasion code is surprisingly effective, because some virtual machine sandbox platforms do not have a six-button mouse. In the example of FIG. 4, the sample 400 includes code blocks 420-424. For purposes of illustration, the entry point of the sample 400 is presumed to be in the evasion code block 420.

In the sample 400, an API call to GetSystemMetrics (see 401) with argument "0x2Bh" (see 402), which indicates the enumeration symbol of SM_CMOUSEBUTTONS, retrieves the number of buttons of a mouse. The number of buttons of the mouse in the computer is then compared to the number six (see 403) to determine if the computer has a six-button mouse. If the computer has no six-button mouse, the conditional branch at memory location 0x00406ae1 (see 404) branches execution to the code block 421 (see arrow 411). The code block 421 does not perform any malicious behavior, so the sample 400 will look like a normal program at runtime during dynamic analysis. More particularly, when the computer does not have a six-button mouse, the execution path from the code block 420 to the code blocks 422-424 is not taken.

During path guide generation, the path guide generator 211 identified "ShellExecuteW", which is a sensitive operation defined in the configuration file 212, in the code block 423 (see 405). Accordingly, the path guide generator 211 deems the code block 423 to be a critical code block. The path guide generator 211 constructs a guided execution path from an entry point in the code block 420, to the code block 422 (see arrow 412), and to the code block 423 (see arrow 413), which includes the identified sensitive operation. In this embodiment, the path guide generator 211 generates a guided execution path that includes code blocks within the sample 400, which is the current function. For example, for performance reasons, although the sub-function of 0x406c00 is invoked at memory location 0x406b24 in the code block 423 (see arrow 406), the path guide generator 211 does not necessarily have to dive into and take further recursive analysis.

In the example of FIG. 4, the path guide generator 211 identifies the code block 423 as flowing to the code block 424 (see arrow 414) and the code block 422 as flowing to the code block 424 (see arrow 415). Accordingly, in the example of FIG. 4, the guided execution path includes execution to the code blocks 420, 422, 423, and 424. The path guide generator 211 determined that the guided execution path is feasible, and thus turned it into the path guide 215 for the sample 400. Table 4 shows an example path guide 215 for the sample 400 in accordance with an embodiment of the present invention.

TABLE 4

{
    {
      Branch: "0x406ad0 -> 0x406aff",
      PatchAddress : 0x406ae1 ,
      PatchCode : "\xEB\x1C"
    },
    {
      Branch: "0x406aff -> 0x406b1e",
      PatchAddress : 0x406ae1 ,
      PatchCode : "\x90\x90"
    }
}

In the example of Table 4, the path guide 215 contains two sets of code patches that are organized in the two pairs of brackets. The first pair of brackets guides the execution flow to be transferred from the code block 420 (starts at memory location 0x406ad0) to the code block 422 (starts at memory location 0x406aff) by applying the patch code "\xEB\x1C" at the address "0x406ae1". The patch code represents the instruction of "jmp 0x406aff", meaning that the original code at memory location 0x406ae1 would be replaced by the patch code to allow for a direct jump from the code block 420 to the target code block 422.

Similarly, the second pair of brackets transfers the flow from the code block 422 (starts at memory location 0x406aff) to the code block 423 (starts at memory location 0x406b1e) with the patch code "\x90\x90". It replaces the original code at 0x406ae1 with two NOP instructions, indicating no operation and just follow the original execution, falling through to the next code block 423. Generally, the path guide 215 for the sample 400 may include code patches to force execution from the entry point in the code block 420 to the code block 422 and to the code block 423.

When the dynamic analyzer 213 executes the sample 400 with the path guide 215 applied, the original control flow graph of FIG. 4 is changed to allow execution to critical code blocks. After the original code is replaced with the patch code, both the branch from the code block 420 to the code block 421 and the branch from the code block 422 to the code block 424 are eliminated. The execution flow becomes a linear path, starting from the code block 420, through the code blocks 422 and 423, and finally ends at the code block 424. This way, the instructions in the code block 423 will be executed, regardless of whether or not the dynamic analyzer 213 has a six-button mouse in its sandbox, and the malicious behavior of downloading a payload is exposed.

Systems and methods for dynamically analyzing malware that have evasion code have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of evaluating sample programs for malware, the method comprising:
   receiving a sample program that originally has a conditional branch instruction;
   scanning the sample program for presence of a critical code block;
   identifying the critical code block in the sample program;
   generating a path guide for the sample program, the path guide including information for executing the sample program along a guided execution path that leads to the critical code block;
   executing the sample program in a sandbox with the path guide applied to the sample program, wherein the path guide sets a condition of the conditional branch instruction to branch and force execution of the sample program to the critical code block;
   observing the behavior of the sample program as the sample program executes to the critical code block to evaluate the sample program for malware;
   detecting the sample program to be malware based on observed behavior of the sample program; and
   in response to detecting the sample program to be malware, performing a response action against the sample program.

2. The computer-implemented method of claim 1, further comprising:
   forwarding the sample program and the path guide to the sandbox, wherein the sandbox comprises a virtual machine sandbox.

3. The computer-implemented method of claim 1, further comprising:
   forwarding the sample program and the path guide to a dynamic analysis system over a computer network, wherein the dynamic analysis system includes the sandbox.

4. The computer-implemented method of claim 1, wherein the path guide includes a code patch that sets the condition of the conditional branch instruction.

5. The computer-implemented method of claim 1, further comprising:
   indicating a sensitive operation and an insensitive operation in a configuration file; and
   consulting the configuration file to identify the critical code block in the sample program as having the sensitive operation.

6. The computer-implemented method of claim 5, wherein the sensitive operation is an application programming interface call.

7. The computer-implemented method of claim 5, wherein the insensitive operation is a function to stop execution of the sample program.

8. The computer-implemented method of claim 1, wherein the path guide is empty when the sample program does not have the critical code block.

9. The computer-implemented method of claim 1, wherein the path guide dictates branches to take from an entry point of the sample program to the critical code block.

10. A computer comprising a memory and a processor, the memory storing instructions that when executed by the processor cause the computer to perform the steps of:
    receiving, by a controller, a sample program to be evaluated for malware, the sample program originally including a conditional branch instruction;
    forwarding, by the controller, the sample program to a path guide generator;
    generating, by the path guide generator, a path guide that includes information for modifying execution of the sample program to force execution along an execution path from a first code block of the sample program to a second code block of the sample program;
    forwarding, by the controller, the sample program and the path guide to a dynamic analyzer;
    executing the sample program in the dynamic analyzer with the path guide applied to the sample program, wherein the path guide sets a condition of the conditional branch instruction to branch and force execution of the sample program along the execution path from the first code block of the sample program to the second code block of the sample program; and
    observing, by the dynamic analyzer, a behavior of the sample program as executed along the execution path as dictated by the path guide, to evaluate the sample program for malware.

11. The computer of claim 10, wherein the dynamic analyzer comprises a virtual machine sandbox.

\* \* \* \* \*